United States Patent
Ohtsuki

Patent Number: 5,224,080
Date of Patent: Jun. 29, 1993

[54] METHOD, APPARATUS, AND MEDIUM FOR MAGNETO-OPTICAL RECORDING

[75] Inventor: Tomoko Ohtsuki, Chiyoda, Japan

[73] Assignee: International Business Machines Corporation, Armonk, N.Y.

[21] Appl. No.: 821,520

[22] Filed: Feb. 18, 1992

[30] Foreign Application Priority Data

Jan. 23, 1991 [JP] Japan .................................. 3-021472

[51] Int. Cl.$^5$ .................................................. G11B 7/00
[52] U.S. Cl. ........................................ 369/13; 360/59
[58] Field of Search ...................... 369/13, 14, 110; 360/59, 114; 365/122

[56] References Cited

U.S. PATENT DOCUMENTS

| | | | |
|---|---|---|---|
| 4,926,402 | 5/1990 | Masakawa | 369/13 |
| 5,088,074 | 2/1992 | Sato | 369/13 |
| 5,128,910 | 7/1992 | Iida | 369/13 |

Primary Examiner—Robert J. Pascal
Assistant Examiner—Tan Dinh
Attorney, Agent, or Firm—Douglas R. Millett

[57] ABSTRACT

The medium consists of two exchange-coupled RE-TM amorphous layers (a memory layer and a reference layer) whose Curie temperatures are almost the same and only one of which is RE-rich without a compensation temperature, the two layers being laminated directly or indirectly with an intermediate layer that allows exchange-coupling to be interposed. Before recording is carried out, the reference layer is magnetized in one direction. Pulses of energy are emitted from the memory layer side so that the temperature of the reference layer remains below its Curie temperature when one of the bit data is recorded but reaches its Curie temperature when the other of the bit data is recorded.

22 Claims, 8 Drawing Sheets

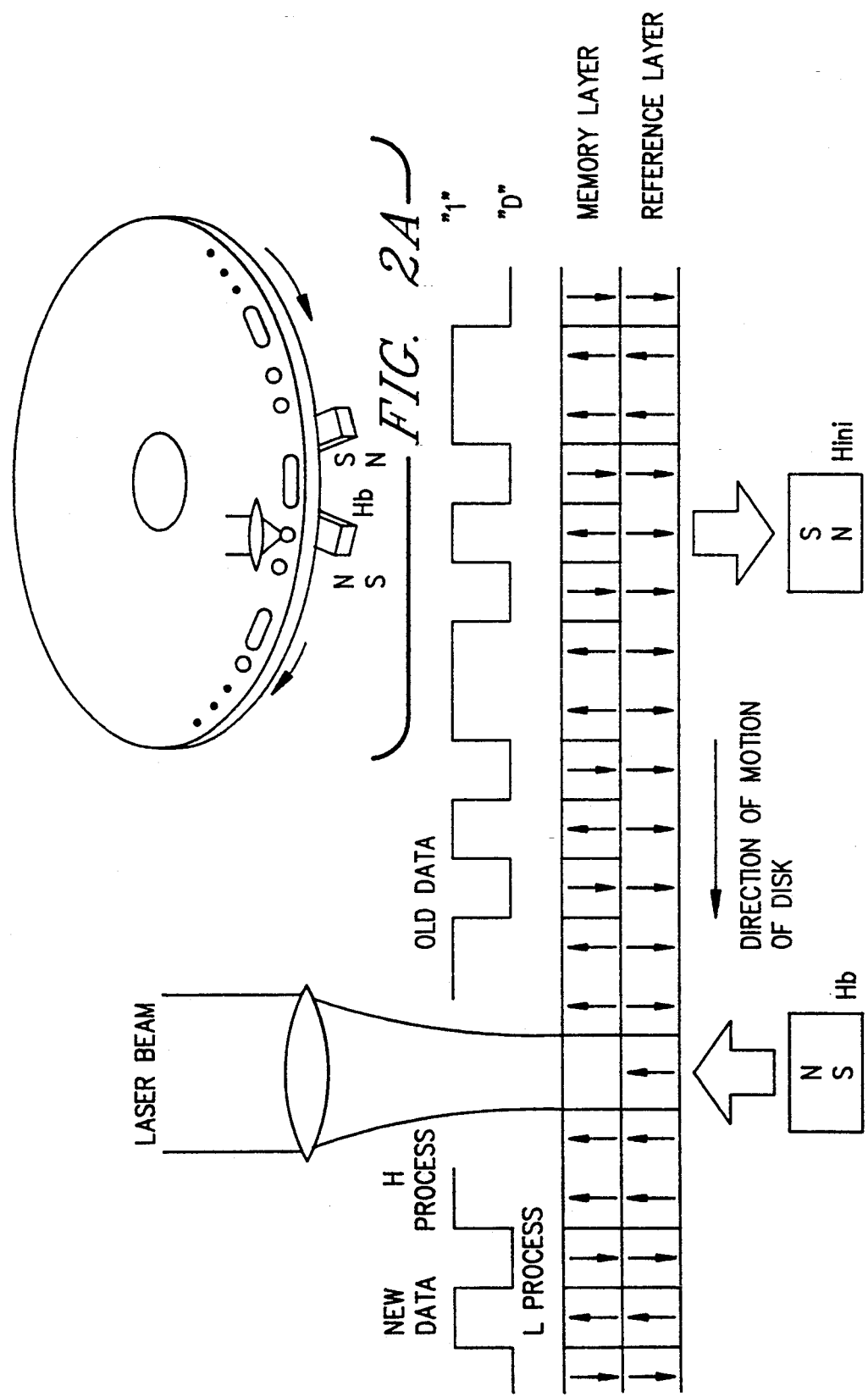

TEMPERATURE DEPENDENCE
OF COERCIVE FORCE OF MEDIA

COMPOSITION AND MAGNETIC PROPERTIES OF
TbFe FILM

METHOD, APPARATUS, AND MEDIUM FOR MAGNETO-OPTICAL RECORDING

BACKGROUND OF THE INVENTION

1. Field of the Invention

This invention relates to a method, apparatus, and medium for magneto-optical recording capable of direct overwriting.

2. Description of the Prior Art

In magneto-optical recording, various methods for direct overwriting have been proposed to improve the data rate. They include a typical example of a light modulation method using a double-layered film, which is disclosed in JA Published Unexamined Patent Application (PUPA) 62-175948.

The contents of this application are also reported by Matsumoto et al. in "Direct Overwrite by Light Power Modulation on Magneto-Optical Double-Layered Media," Digest of 53rd Seminar, the Magnetics Society of Japan (1987), p. 87.

A recording medium used in this method has a recording layer consisting of two layers, a memory layer and a reference layer, which are exchange-coupled. Overwriting is performed by utilizing the difference in temperature dependence of the coercive forces of the two layers. FIG. 1 shows the magnetic properties, and FIGS. 2A and 2B show the overwriting process.

As shown in FIG. 1, the compositions of the two layers are adjusted so that the coercive force of the reference layer (Hr2) is smaller than that of the memory layer (Hr1) at room temperature (Tamb1), and the Curie temperature of the reference layer (Tc2) is higher than that of the memory layer (Tc1). As shown in FIGS. 2A and 2B, one of the characteristics of this method is that an initializing field, as well as a bias field for recording, is applied before data is recorded on the memory layer. The directions of the bias field and the initializing field are anti-parallel. The magnitude of the bias field Hb is set at such a small value as to maintain the magnetization of the reference layer unreversed in the L process, which will be referred to later. On the other hand, the magnitude of the initializing field Hini is set at a value larger than Hr2 but smaller than Hr1. As a result, only the magnetization of the reference layer is oriented parallel to Hini (downward in the figure). The data recorded in the memory layer is not affected by Hini.

For recording, the H process or L process is performed, depending on the bit data to be recorded. In the L process, a low-power laser beam in the form of pulses is emitted so that the temperature of the memory layer TmL becomes $Tc1 < TmL < Tc2$. At this time, the magnetization of the reference layer is not reversed. Therefore, the magnetization of the memory layer is oriented in a direction determined by the exchange-coupling with the reference layer during the cooling process. The term "exchange-coupling" here means a phenomenon such that the subnetwork magnetizations of RE and TM atoms are aligned to those of similar atoms, respectively, even in different layers. Therefore, depending on the compositions of the two layers, the exchange-coupling exerted by one layer during the cooling of the other layer may result in these layers having parallel or anti-parallel directions of magnetization. FIG. 2B shows the case in which the directions of magnetization of the two layers become parallel as a result of exchange-coupling.

In the H process, a high-power laser beam in the form of pulses is emitted, with the result that the temperature of the memory layer TmH becomes $Tc2 < TmH$. Consequently, during the cooling process, the magnetization of the reference layer first coincides with the direction of the bias field (upward in the figure). That is, the direction of magnetization of the reference layer is reversed. When the temperature of the recording layer decreases, the magnetization of the memory layer is oriented in a direction determined by the exchange-coupling with the reference layer. Since the direction of magnetization of the reference layer has been reversed from that in the L process, the direction of magnetization of the memory layer is also reversed from that in the L process.

As described above, the method of JA PUPA 62-175948 needs an external field for initializing the reference layer (initializing field) before recording (by the L process or H process), in addition to an external field applied during recording (a bias field). This makes the apparatus complicated. The above method also involves the problem that data recorded in the memory layer are lost owing to the influence of the strong initializing field. Moreover, this method also involves the problem that strict requirements for the Curie temperatures and coercive forces of respective layers result in less flexibility in the selection of materials and necessitate accurate control of the compositions of materials during the preparation of media.

Some methods of eliminating the initializing field have been proposed. Among them, T. Fukami and his colleagues' "Novel direct overwriting technology for magneto-optical disks by exchange-coupled RE-TM quadrilayered films," J. Appl. Phys. 67(9), May 1, 1990 uses quadrilayered films as recording media and makes the Curie temperatures, coercive forces, and inter-layer exchange-coupling forces of respective layers different. In this method, however, the number of layers of the medium is increased to four and these layers need to satisfy certain relative requirements with respect to Curie temperatures, exchange-coupling forces, and so on. Therefore, this method not only fails to remove the restrictions on the compositions of materials, but rather increases them. In order to satisfy the requirements, highly accurate control of the composition of each layer is necessary, and hence the production cost of media becomes a problem affecting their practical use. Further, the total thickness of four layers amounts to a value of the order of 2600 Angstroms. This results in lower writing efficiency and hence requires higher laser energy.

SUMMARY OF THE INVENTION

Therefore, an object of the invention is to provide a method and apparatus for magneto-optical recording capable of direct overwriting, using a multi-layered film that does not need an initializing field and that never causes erroneous erasure of recorded data.

Another object of the invention is to provide a method and apparatus for magneto-optical recording capable of direct overwriting that alleviates the restrictions on the compositions of materials for media.

Still another object of the invention is to provide a medium for use in the above-mentioned magneto-optical recording.

In both processes for recording bit data, the method of JA PUPA 62-175948 utilized exchange-coupling to orient the magnetization of the memory layer in a direction determined by the exchange-coupling with the reference layer. Therefore, the magnetization of the reference layer has to be reversed in the recording process for one of the bit data. This is why the method needs an external field for initializing the reference layer (an initializing field) before recording.

In order to overcome the problem, the present invention uses, instead of a medium as shown in FIG. 1, a novel medium consisting of two exchange-coupled rare earth-transition metal amorphous (RE-TM) layers whose Curie temperatures are almost the same and only one of which is RE-rich without a compensation temperature, the two layers being laminated directly or indirectly with an intermediate layer that allows exchange-coupling to be interposed. Before recording, one of the two layers is magnetized in one direction beforehand. Either one of the magnetized RE-TM layers is used as the reference layer, and the other is used as the memory layer. Magnetization of the reference layer has to be carried out only once, before all data writing processes. In contrast, JA PUPA 62-175948 magnetizes the reference layer in a desired writing area every time data writing is carried out, that is, before each emission of a laser pulse. Note, therefore, that the magnetization of the reference layer performed beforehand in the present invention is not the same as the "initialization" referred to in JA PUPA 62-175948.

Writing of data is carried out by:

(a) moving the medium relative to an energy source in a bias field, with the reference layer being farther from the energy source than the memory layer;

(b) emitting to the medium when recording one of the bit data a pulse of energy such that the temperature of the memory layer becomes near or above its Curie temperature while that of the reference layer remains below its Curie temperature; and (c) emitting to the medium when recording the other of the bit data a pulse of energy such that the temperatures of the two layers become near or above their Curie temperatures.

In step (b), the direction of magnetization of the memory layer is determined by the exchange-coupling with the reference layer. In step (c), the direction of magnetization of the memory layer is determined by the direction of the bias field. On the other hand, the direction of magnetization of the reference layer maintains the direction of its original magnetization regardless of whether step (b) or (c) is carried out. Since the direction of magnetization of the reference layer is not reversed, the medium does not need an initializing field, which was needed in JA PUPA 62-175948.

For a fuller understanding of the nature and advantages of the present invention reference should be made to the following detailed description taken in conjunction with the accompanying drawings.

BRIEF DESCRIPTION OF THE DRAWINGS

FIGS. 2A and 2B are explanatory diagrams showing the principle of a prior art magneto-optical recording method capable of direct overwriting;

DESCRIPTION OF THE PREFERRED EMBODIMENTS

Figure 3A:
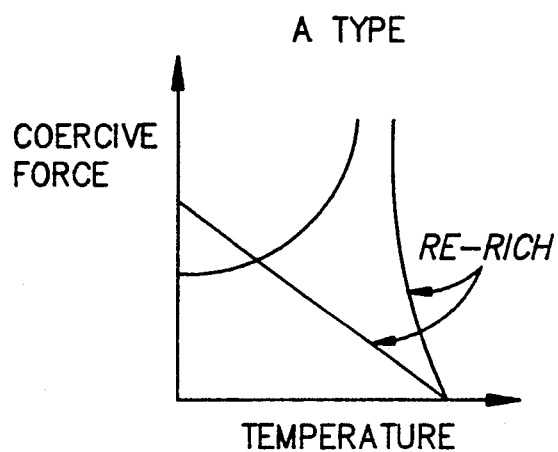
FIGS. 3A and 3B are diagrams illustrating the temperature dependence of the coercive force of magneto-optical recording media capable of direct overwriting according to the invention.
Figure 3B:
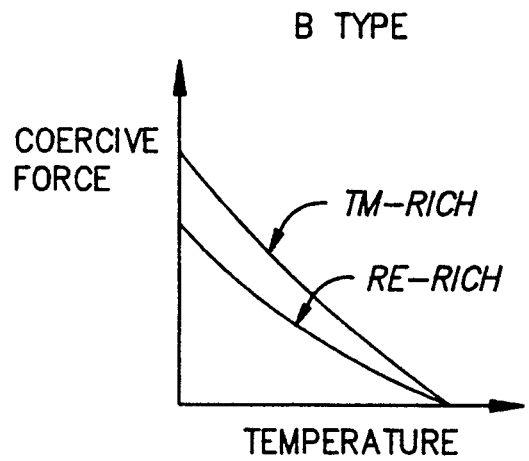

FIGS. 3A and 3B show two types of temperature dependence of the coercive force of double-layered films used in the present invention. A Curie temperature is a temperature at which the coercive force becomes zero. A compensation temperature is a temperature at which the coercive force diverges. In either case, the following two requirements must be satisfied:

(1) The Curie temperatures of the two layers are almost the same; and (2) only one of the layers is RE-rich without a compensation temperature.

Figure 4:
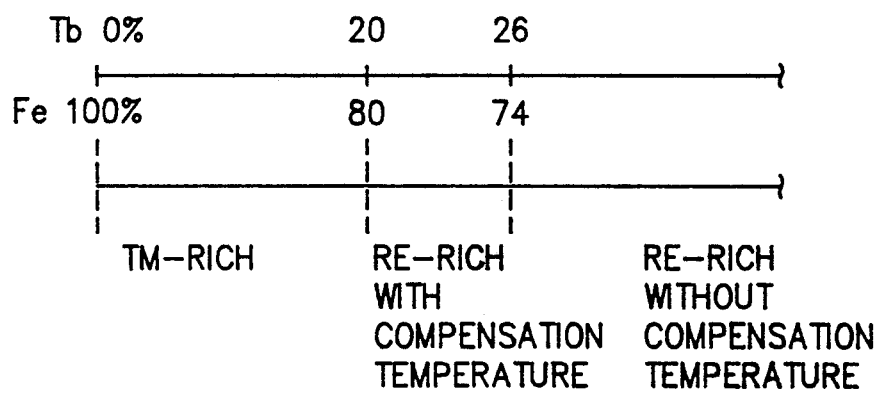
FIG. 4 is a diagram illustrating the relationship between the composition and magnetic properties of TbFe films.

For example, when a typical magneto-optical recording material, TbFe film, is used for both layers, since Curie temperatures do not substantially vary with the ratio of Tb and Fe, requirement (1) is automatically satisfied. In this respect, considering that the method of JA PUPA 62-175948 controls the combinations and compositions of three to four kinds of elements in order to distinguish the Curie temperatures of two layers, it is easier to prepare media according to the present invention. Requirement (2) can readily be satisfied in the case of a TbFe film by merely setting the composition ratio of Tb at a value above 26% for one of the layers and below 26% for the other layer (see FIG. 4).

Thus, the invention largely removes restrictions on the materials used for media. In the subsequent description, a medium in the form of a lamination consisting of (1) an RE-rich layer without a compensation temperature and (2) a TM-rich layer is called A-type, whereas a medium in the form of a lamination consisting of (1) an RE-rich layer without a compensation temperature and (2) a RE-rich layer with a compensation temperature is called B-type. In both types, either of the two layers may be used as the memory layer. In the present invention, the layer facing the laser source behaves as the memory layer.

Between the memory layer and the reference layer may be interposed an intermediate layer whose thickness does not prevent exchange-coupling between them. Insertion of a layer such as Tb or GdFeCo in order to adjust the strength of exchange-coupling is a known technique. See, for example, K. Aratani et al., "Overwriting on a magneto-optical disk with magnetic triple layers by means of the light intensity modulation method," Proc. SPIE 1078, 265 (1989).

The recording method used in the present invention is explained below. Before bit data is written, the magnetization of the layer that will function as the reference layer is oriented in one direction. As will be understood from the subsequent description, overwriting is possible in whatever state the memory layer is magnetized beforehand. Thus, magnetization may be oriented in one direction beforehand throughout the entirety of the medium, including the reference layer. Therefore, preliminary magnetization of the reference layer can be carried out by magnetizing it uniformly in a sufficiently strong field before shipment. If the medium is not magnetized before shipment, magnetization may be carried out by using a magneto-optical recording apparatus referred to later.

After magnetization of the reference layer is complete, bit data is written on the medium in a bias field. It is preferable to use short pulses (of a few nanoseconds) for writing one of the bit data and long pulses (tens of nanoseconds or more) for writing the other of the bit data. As disclosed by T. Ohtsuki et al. in "Direct overwrite by short pulses on double-layered MO media," Conference Digest of Topical Meeting on Optical Data Storage, 172 (1990), when short pulses with a duration of the order of one nanosecond are emitted to the magneto-optical recording medium from the memory layer side, marked temperature gradients are produced in the two layers, and hence only the temperature of the memory layer rises above the Curie temperature, while the reference layer remains at a temperature low enough to maintain the magnetization. In this case, during the process of cooling the memory layer, a strong exchange-coupling above 1000 (Oe) is exerted on the memory layer by the reference layer. Therefore, if the magnitude of the bias field is set lower than that of the exchange-coupling, the direction of magnetization of the memory layer is determined by the exchange-coupling with the reference layer. It is sufficient to apply a field of the order of 500 (Oe) by using, for example, a permanent magnet. In the present method, the process executed while the reference layer is maintained at a low temperature below its Curie temperature is called the L process.

In contrast, when long pulses with a duration of tens of nanoseconds or more are emitted, both layers are heated above their Curie temperatures and marked temperature gradients are not induced in the direction of the thickness of the medium. When the heating is finished and the medium has cooled to the Curie temperature, at which magnetization of the memory layer is determined, magnetization of each of the two layers is determined according to the direction of the bias field, because the exchange-coupling between the two layers is sufficiently small (if the Curie temperatures of the two layers are absolutely equal, the strength is 0 (Oe)). In the present method, the process that includes a step in which the reference layer is heated to a high temperature near or above its Curie temperature is called the H process.

The step in the H process in which the direction of magnetization of the memory layer is determined is now explained in greater detail. If there is a difference between the Curie temperatures of the two layers, the direction of magnetization is first determined by the bias field for the layer whose Curie temperature is higher (TcH layer). Therefore, at the instant when the medium has further cooled to the Curie temperature of the other layer (TcL layer), exchange-coupling with the TcH layer as well as the bias field is exerted on the TcL layer. At this time, the larger the difference between the Curie temperatures of the two layers, the greater the strength of the exchange-coupling. In the present invention, however, it is required that the direction of magnetization of the TcL layer should follow the direction of the bias field. Therefore, the difference between the Curie temperatures of the two layers must be so small that the strength of the exchange-coupling between the two layers does not prevent magnetization of the memory layer by the bias field. As explained above, it is easy to produce such a double-layered film in which the Curie temperatures are sufficiently close.

Presented below is a detailed explanation of how overwriting is carried out when the aforementioned requirements are met. First, with reference to FIGS. 5, 6A, 6B, 7A and 7B an overwriting process using an A-type medium is explained. An A-type double-layered film is stable at room temperature in a state in which the directions of magnetization are oriented anti-parallel to each other by exchange-coupling. It is assumed here that the memory layer 10 is TM-rich and that the reference layer 12 is RE-rich without a compensation temperature. It is also assumed that the magnetization of the reference layer 12 has been oriented upward beforehand and that the direction of the bias field is upward.

When short pulses are emitted, the memory layer 10 is heated to a temperature TmL above its Curie temperature, but the reference layer 12 is heated only to a temperature TrL below its Curie temperature (see FIG. 5). As a result, immediately after the heating, only the reference layer 12 in the heated area maintains the magnetization set before the heating (see FIG. 6A). When the memory layer 10 has cooled, the magnetization is oriented downward by exchange coupling with the reference layer 12 (see FIG. 6B).

Figure 5:
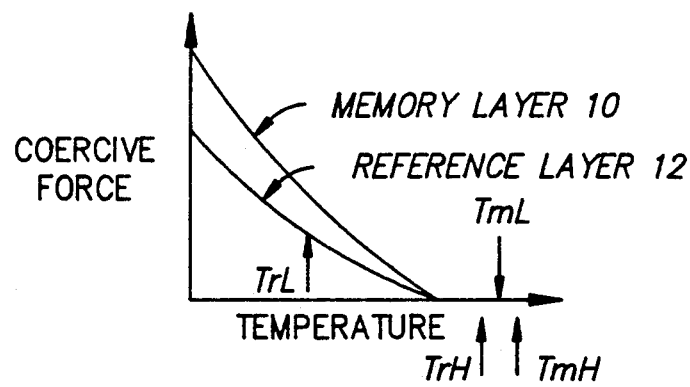
FIG. 5 is a diagram illustrating the temperature dependence of the coercive force of a first example of magneto-optical recording media.
Figure 6A:
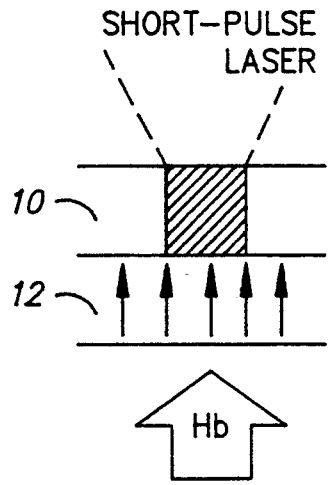
FIGS. 6A and 6B are explanatory views of a magneto-optical recording process using the medium shown in FIG. 5.
Figure 6B:
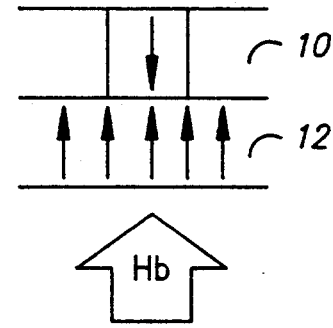
Figure 7A:
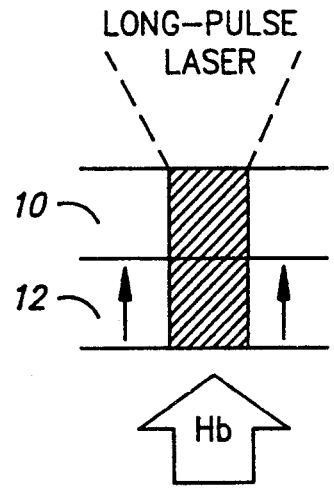
FIGS. 7A and 7B are explanatory diagrams of a magneto-optical recording process using the medium shown in FIG. 5.
Figure 7B:
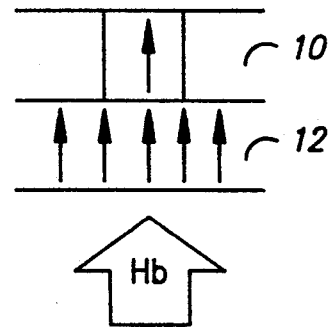

When long pulses are emitted, both the memory layer 10 and the reference layer 12 are heated to temperatures (TmH and TrH) above their Curie temperatures (see FIG. 5). As a result, both layers in the heated area lose their magnetizations set before the heating (see FIG. 7A). When the medium has cooled, the magnetization of both layers is oriented upward by the bias field (see FIG. 7B). Throughout the L process (see FIGS. 6A and 6B) and the H process (see FIGS. 7A and 7B), the magnetization of the reference layer 12 is maintained upward as in the original state. Even though the memory layer 10 is RE-rich and the reference layer 12 is TM-rich, overwriting is also carried out through the same steps.

Next, with reference to FIGS. 8, 9A-C, and 10A-C, an example of an overwriting process using a B-type medium is explained. The magnetization direction of a layer with a compensation temperature is changed at the compensation temperature. Therefore, a B-type double-layered film is stable at room temperature in a state in which the directions of magnetization of the two layers are oriented parallel to each other by exchange-coupling. When the temperature of a layer with a compensation temperature exceeds the compensation temperature, the film becomes stable in a state in which the directions of magnetization of the two layers are anti-parallel. It is assumed here that the memory layer 20 has a compensation temperature and that the reference layer 22 does not. It is also assumed that the magnetization of the reference layer 22 has been oriented upward beforehand and that the direction of the bias field is upward.

When short pulses are emitted, the memory layer 20 is heated to the temperature TmL above its Curie temperature, but the reference layer 22 is heated only to the temperature TrL below its Curie temperature (see FIG. 8). Therefore, immediately after the heating, only the reference layer 22 maintains the magnetization set before the heating in the heated area (see FIG. 9A). When the memory layer 20 is cooled below the Curie temperature, the magnetization is first oriented downward by the exchange-coupling with the reference layer 22 (see FIG. 9B). When the memory layer 20 is further cooled below its compensation temperature, the magnetization is changed upward, and the medium is stabilized in this state at room temperature (see FIG. 10C).

Figure 8:
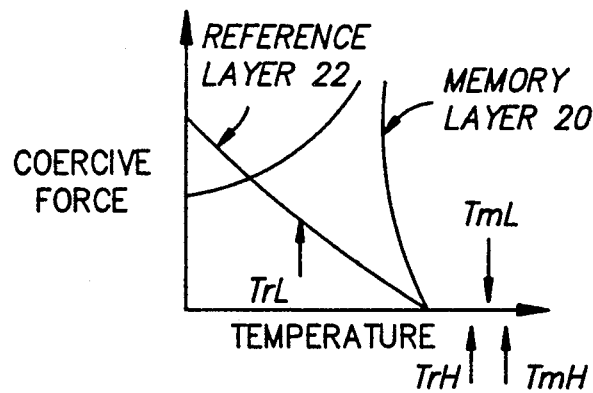
FIG. 8 is a diagram illustrating the temperature dependence of the coercive force of a second example of magneto-optical recording media.
Figure 9A:
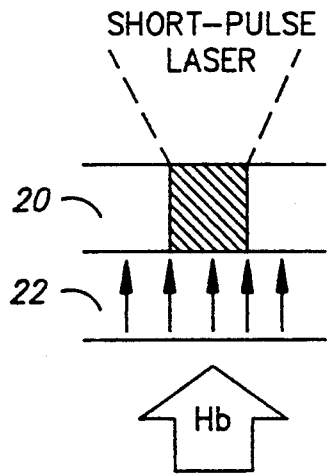
FIGS. 9A, 9B and 9C are explanatory diagrams of a magneto-optical recording process using the medium shown in FIG. 8.
Figure 9B:
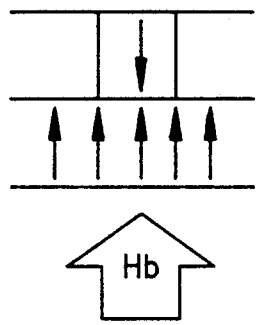
Figure 9C:
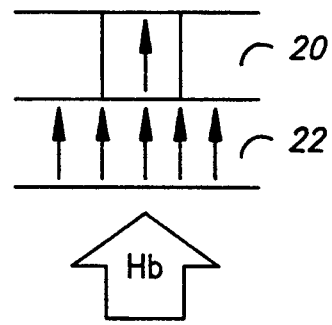
Figure 10A:
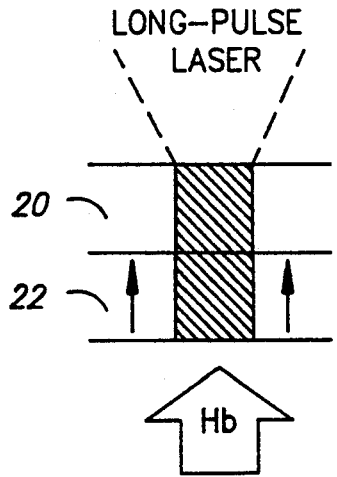
FIGS. 10A, 10B and 10C are explanatory diagrams of a magneto-optical recording process using the medium shown in FIG. 8.
Figure 10B:
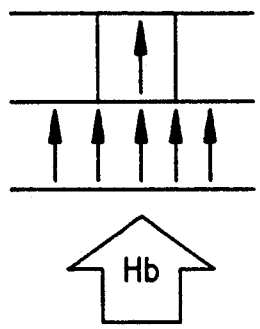
Figure 10C:
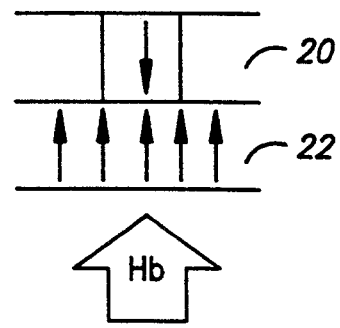

When long pulses are emitted, both the memory layer 20 and the reference layer 22 are heated to temperatures (TmH and TrH) above their Curie temperatures (see FIG. 8). As a result, both layers in the heated area lose their magnetization set before the heating (see FIG. 10A). When the medium starts to cool down, the magnetization of both layers is first oriented upward by the bias field (see FIG. 10B). When the medium has cooled further and the temperature of the memory layer 20 decreases below its compensation temperature, only the magnetization of the memory layer 20 is reversed downward (see FIG. 10C). Throughout the L process (FIGS. 9A, B, C) and the H process (FIGS. 10A, B, C), the direction of magnetization of the reference layer 22 remains upward as in the initial state.

Next, with reference to FIGS. 11, 12A-C and 13A-13C, another example of an overwriting process using a B-type medium is explained. It is assumed here that the memory layer 30 does not have a compensation temperature but that the reference layer 32 does. It is also assumed that the magnetization of the reference layer 32 has been oriented upward beforehand and that the bias field is oriented downward.

When short pulses are emitted, the memory layer 30 is heated to a temperature TmL above its Curie temperature, but the reference layer 32 is heated only to a temperature TrL below its Curie temperature (see FIG. 11). If the peak temperature TrL is lower than the compensation temperature immediately after the heating, only the reference layer 32 maintains the magnetization set before the heating in the heated area (see FIG. 12A). Therefore, when the memory layer 30 is cooled below its Curie temperature, the magnetization is oriented upward by exchange-coupling with the reference layer 32 (see FIG. 12B). In another case where the peak temperature TrL of the reference layer 32 exceeds the compensation temperature, the direction of magnetization of the reference layer 32 immediately after the heating is reversed downward (see FIG. 12A'). When the medium is cooled, the magnetization of the reference layer 32 is again reversed upward. However, regardless of the direction of the magnetization of the reference layer 32, downward (see FIG. 12B') or upward (see FIG. 12C'), throughout the process, the final state when the peak temperature TrL exceeds the compensation temperature (see FIG. 12C') is the same as that of when it does not exceed the compensation temperature (see FIG. 12B), because exchange-coupling is exerted by the reference layer on the memory layer 30 to orient the magnetization upward.

Figure 11:
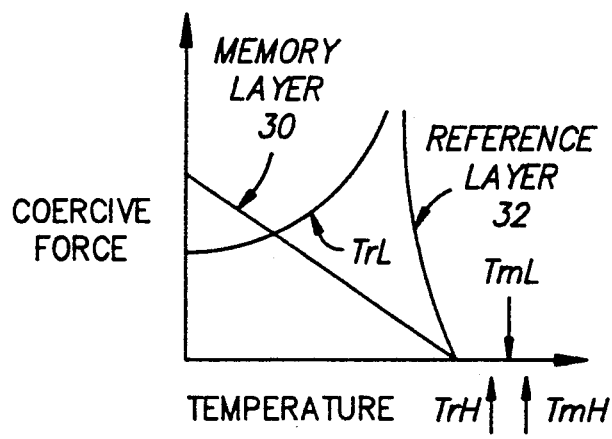
FIG. 11 is a diagram illustrating the temperature dependence of the coercive force of a third example of magneto-optical recording media.
Figure 12A:
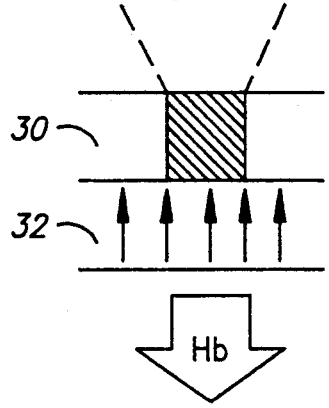
FIGS. 12A, 12B, 12A', 12B', 12C' are explanatory diagrams of a magneto-optical recording process using the medium shown in FIG. 11.
Figure 12B:
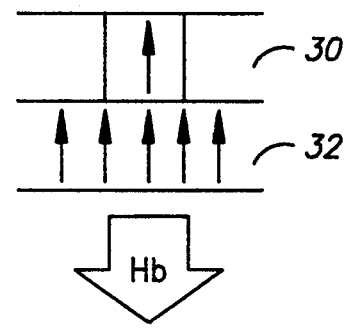
Figure 12A:
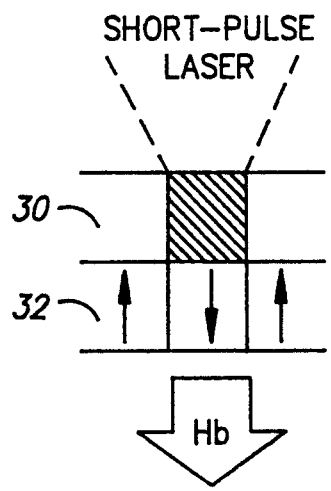
Figure 12B:
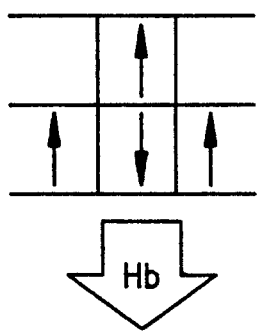
Figure 12C:
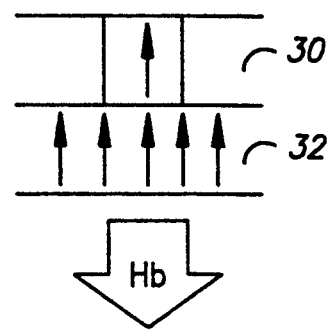

When long pulses are emitted, both the memory layer 30 and the reference layer 32 are heated to temperatures (TmH and TrH) above their respective Curie temperatures (see FIG. 11). Therefore, both layers in the heated area lose their magnetization set before the heating (see FIG. 13A). When the medium starts to cool down, the magnetization of both layers is first oriented downward by the bias field (see FIG. 13B). When the medium is cooled further and the temperature of the reference layer 32 decreases below the compensation temperature, only the magnetization of the reference layer 32 is reversed upward (see FIG. 13C). In the final state of the L process (FIGS. 12B and 12C') and the H process (FIG. 13C'), the magnetization of the reference layer 32 remains upward as in the initial state.

Figure 1:
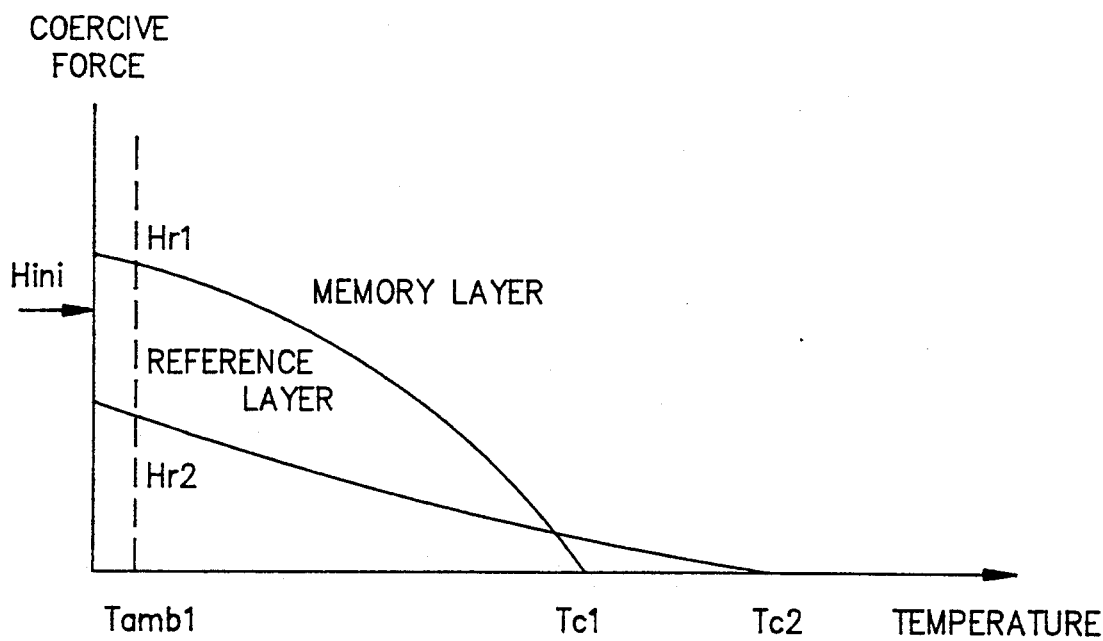
FIG. 1 illustrates the temperature dependence of the coercive force of prior art magneto-optical recording media capable of direct overwriting.
Figures 13A, 13B, 13C:
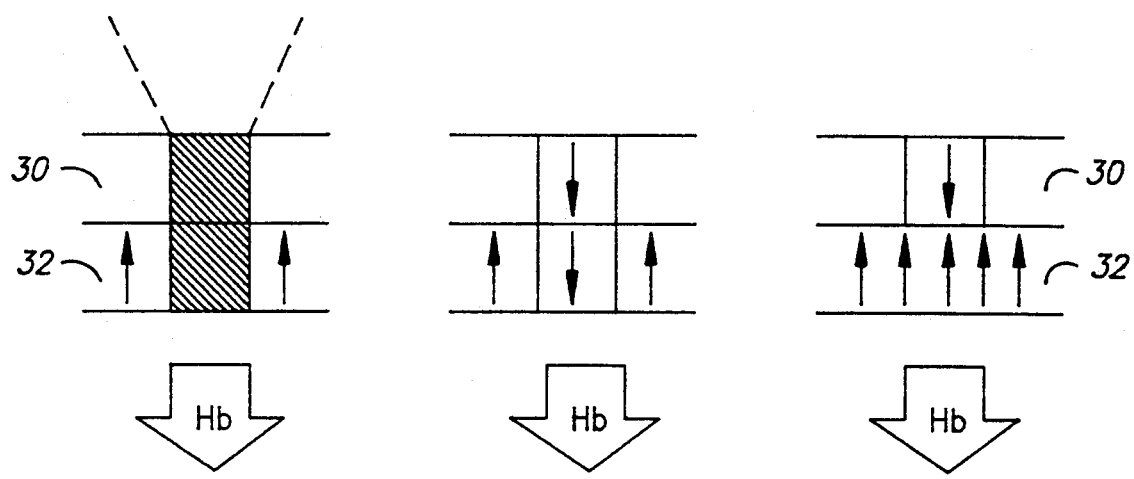
FIGS. 13A, 13B and 13C are explanatory diagrams of a magneto-optical recording process using the medium shown in FIG. 11.
Figure 14:
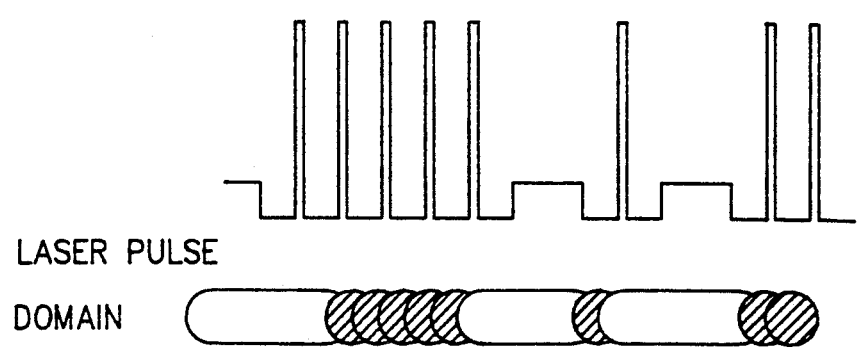
FIG. 14 is an explanatory diagram of a writing process for domains of variable length.

FIG. 14 is a schematic diagram of the laser power and the shape of the domains formed upon execution of overwriting. In order to record data of variable length, a continuous series of short pulses is used for one of the bit data, and long pulses different in duration are used for the other of the bit data. The formed domains are shaped like arrow feathers, in the same way as those formed by the field modulation overwrite method. Therefore, compatibility of data is expected between the light modulation overwrite method and the field modulation overwrite method.

Figure 15:
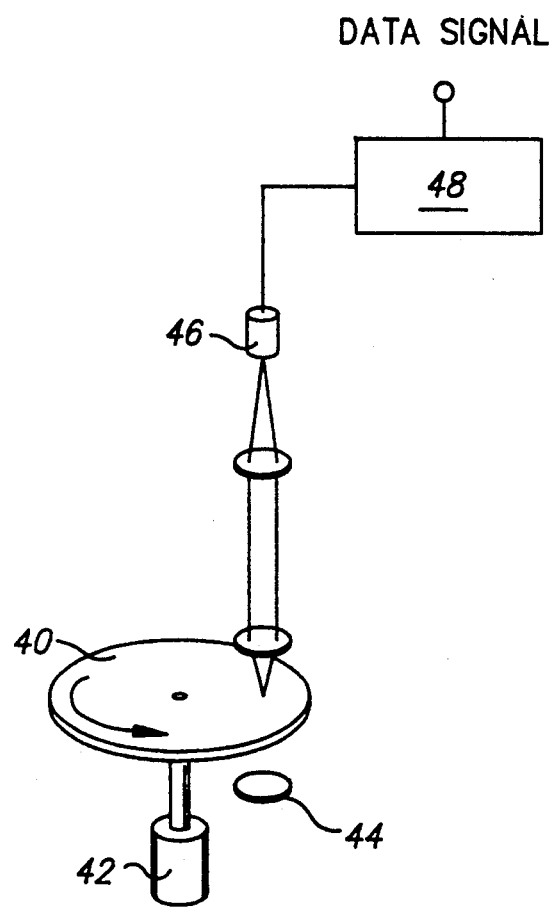
FIG. 15 is a schematic diagram illustrating the composition of a magneto-optical recording apparatus according to the invention.

FIG. 15 shows a schematic view illustrating the composition of a magneto-optical recording apparatus according to the invention. This apparatus includes a means 42, which may be a rotating means, for moving a recording medium 40, a means 44 for generating a bias field, a laser source 46, and a means responsive to the bit data to be recorded for modulating the duration and power of laser pulses. Between the laser source 46 and the recording medium 40 may be interposed a known optical system. The means for generating a bias field may be an electromagnet or a permanent magnet. A permanent magnet is more advantageous from the viewpoint of power consumption and heat generation. If the laser source 46 consists of a semiconductor diode, the means 48 modulates the time width and strength of the current pulses to be supplied to the semiconductor diode, in response to the bit data to be recorded.

If the apparatus shown in FIG. 15 is used to emit a continuous series of laser beams in a bias field and to heat both layers of the medium 40 above their Curie temperatures, the magnetization can be oriented in one direction throughout the medium, including the reference layer, before the bit data are recorded.

Figure 16:
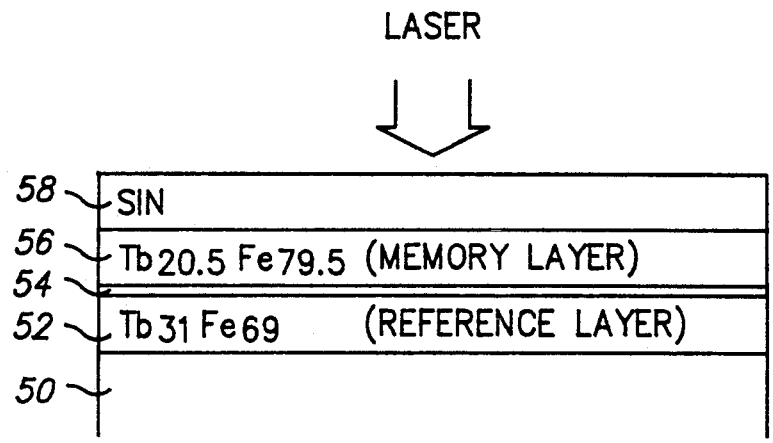
FIG. 16 is a schematic diagram illustrating the composition of a medium used in an experiment.

FIG. 16 shows the construction of a medium used in an experiment on overwriting. On a glass substrate 50 were deposited, by sputtering, a RE-rich reference layer 52 that is 1200 Angstroms thick and made of $Tb_{31}Fe_{69}$, an intermediate layer 54 that is 6 Angstroms thick and made of Tb, a TM-rich memory layer 56 that is 800 Angstroms thick and made of $Tb_{20.5}Fe_{79.5}$, and a protective layer 58 that is 700 Angstroms thick and made of SiN. The thicknesses of the respective layers were estimated from their sputtering times. The memory layer 56 and the reference layer 52 of the prepared medium were oriented in one direction beforehand.

The diameter of the focused laser spot used in the experiment was 0.47 microns (full-width at half-maximum), and the laser beam was emitted from the side of the protective layer 58 of the medium. The strength of the bias field was 480 (Oe), and the numerical aperture of the objective lens of the optical system was 0.95. The L process (writing) and H process (erasure) of overwriting are as shown in FIGS. 7 and 8, respectively. In the L process, the duration of the laser pulse was 3.8 ns, and the power was 14.5 mW. In the H process, the duration of the laser pulse was 50 ns, and the power was 4.5 mW.

Figure 17:
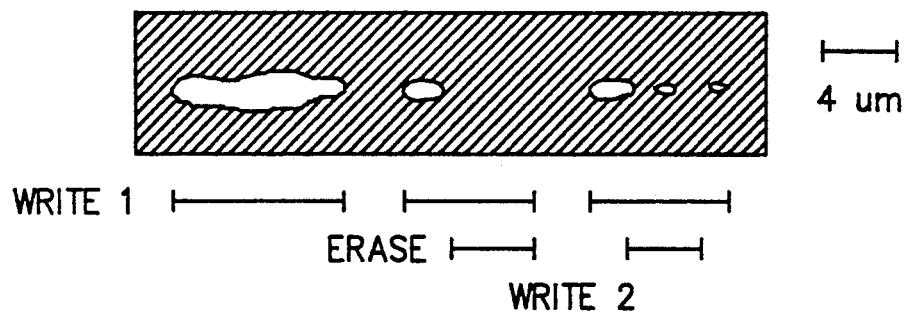
FIG. 17 is a drawn copy of a photomicrograph of a medium surface after overwriting.

In the foregoing conditions, domains of variable length were written and erased by the writing process (L process) and by the erasing process (H process), after both of which the medium was moved by 0.3 microns. More specifically, domains of variable length were first written (write 1), a part of the domains was erased, and subsequently writing was again performed in the erased area (write 2). FIG. 17 is a drawn copy of a photograph of the written domains observed with a polarizing microscope from the side of the memory layer 56. It is clear from the figure that overwriting was certainly done in accordance with the H process and the L process.

Next, the power range that permits writing was examined by varying the power while maintaining the duration of the laser pulse for the writing process (L process) at 3.8 ns. The successful range was from 10 mW to 37 mW. Thus, in the L process, if short pulses of the order of 1 ns are emitted, the power range permitting the memory layer to be heated while maintaining the reference layer 52 at a low temperature is extended, and the margin is increased, accordingly.

In the same conditions, an experiment was carried out to examine the power range that permits writing, by varying the power while maintaining the duration of the laser pulse for the writing process (L process) at 50 ns. As a result, writing was achieved in the range from 1.5 mW to 3.1 mW. The reasons for the success of writing appear to be that a 50 ns pulse can induce rather small temperature gradients along the thickness because of the intermediate layer 54, and that the Curie temperatures of the actually prepared reference layer 52 and memory layer 56 do not strictly coincide. Thus, even when the laser pulse in the L process in the present invention is the same long pulse as that in the H process, it is possible to write one of the bit data. However, the laser power range that permits writing becomes narrower than for a short pulse.

The invention makes possible direct overwriting without an initializing field. In this way, erroneous erasure of recorded data is avoided.

Further, the invention largely removes the restrictions on the compositions of materials for magneto-optical recording media for direct overwriting. As a result, it allows more flexibility in the selection of materials and lower accuracy in the control of material compositions than the prior art.

While the preferred embodiments of the present invention have been illustrated in detail, it should be apparent that modifications and adaptations to those embodiments may occur to those skilled in the art without departing from the scope of the present invention as set forth in the following claims.

What is claimed is:

1. A direct overwriting method using a medium comprised of two exchange-coupled RE-TM amorphous layers whose Curie temperatures are substantially the same and only one of which is RE-rich without a compensation temperature, said two layers being laminated directly or indirectly with an intermediate layer that allows exchange-coupling to be interposed, comprising the steps of:
   (a) magnetizing one of said two layers in one direction beforehand;
   (b) moving said medium relative to an energy source in a bias field with said one layer farther from the energy source than the other layer;
   (c) emitting to said medium when recording one of the bit data a pulse of energy from the energy source which heats the medium such that the temperature of said one layer remains below its Curie temperature while that of said other layer becomes near or above its Curie temperature; and
   (d) emitting to said medium when recording the other of the bit data a pulse of energy from the energy source which heats the medium such that the temperatures of said two layers become near or above their Curie temperatures.

2. The method of claim 1, wherein in the steps of the method said two layers of the medium are a TM-rich layer and a RE-rich layer without a compensation temperature.

3. The method of claim 1, wherein in the steps of the method said two layers of the medium are a RE-rich layer with a compensation temperature and a RE-rich layer without a compensation temperature.

4. The method of claim 1, wherein in the steps of the method said energy source is a laser source.

5. The method of claim 1, wherein in the step of emitting to said medium when recording one of the bit data a pulse of energy, the pulse is of such a short duration as to induce marked temperature gradients in said two layers.

6. The method of claim 1, wherein in the step of emitting to said medium when recording the other of the bit data a pulse of energy, the pulse is of such a long duration as not to induce marked temperature gradients in said two layers.

7. A direct overwriting method using a medium,
   (i) said medium comprised of two exchange-coupled RE-TM amorphous layers whose Curie temperatures are substantially the same and only one of which is RE-rich without a compensation temperature, said two layers being laminated directly or indirectly with an intermediate layer that allows exchange-coupling to be interposed,
   (ii) one of said two layers being magnetized in one direction beforehand, comprising the steps of;
      (a) moving said medium relative to an energy source in a bias field with said one layer farther from the energy source than the other layer;
      (b) emitting to said medium when recording one of the bit data a pulse of energy from the energy source which heats the medium such that the temperature of said one layer remains below its Curie temperature while that of said other layer becomes near or above its Curie temperature; and (c) emitting to said medium when recording the other of the bit data a pulse of energy from the energy source which heats the medium such that the temperatures of said two layers become near or above their Curie temperatures.

8. The method of claim 7, wherein in the steps of the method said two layers of the medium are a TM-rich layer and a RE-rich layer without a compensation temperature.

9. The method of claim 7, wherein in the steps of the method said two layers of the medium are a RE-rich layer with a compensation temperature and a RE-rich layer without a compensation temperature.

10. The method of claim 7, wherein in the steps of the method said energy source is a laser source.

11. The method of claim 7, wherein the step of emitting to said medium when recording one of the bit data a pulse of energy, the pulse is of such a short duration as to induce marked temperature gradients in said two layers.

12. The method of claim 7, wherein in the step of emitting to said medium when recording the other of the bit data a pulse of energy, the pulse is of such a long duration as not to induce marked temperature gradients in said two layers.

13. A magneto-optical apparatus for directly overwriting data on a medium comprised of two exchange-coupled RE-TM amorphous layers whose Curie temperatures are substantially the same and only one of which is RE-rich without a compensation temperature, said two layers being laminated directly or indirectly with an intermediate layer that allows exchange-coupling to be interposed, comprising:

(a) means for magnetizing one of said two layers in one direction beforehand;
(b) an energy source capable of emitting a pulse of energy;
(c) means for generating a bias field;
(d) means for moving said medium relative to said energy source in said bias field with said one layer farther from the energy source than the other layer; and
(e) means responsive to bit data signals for switching said pulse of energy emitted from said energy source between a first pulse which heats the medium such that the temperature of said one layer remains below its Curie temperature while that of said other layer becomes near or above its Curie temperature, and a second pulse which heats the medium such that the temperature of said two layers become near or above their Curie temperatures.

14. An apparatus according to claim 13, wherein said two layers are a TM-rich layer and a RE-rich layer without a compensation temperature.

15. An apparatus according to claim 13, wherein said two layers are a RE-rich layer with a compensation temperature and a RE-rich layer without a compensation temperature.

16. An apparatus according to claim 13, wherein said energy source is a laser source.

17. An apparatus according to claim 13, wherein said first pulse has such a short duration as to induce marked temperature gradients in said two layers, and said second pulse has such a long duration as to not induce marked temperature gradients in said two layers.

18. A magneto-optical apparatus for directly overwriting data on a medium, (i) said medium comprised of two exchange-coupled RE-TM amorphous layers whose Curie temperatures are substantially the same and only one of which is RE-rich without a compensation temperature, said two layers being laminated directly or indirectly with an intermediate layer which allows exchange-coupling to be interposed,
(ii) one of said two layers being magnetized in one direction beforehand, comprising:
(a) an energy source capable of emitting a pulse of energy;
(b) means for generating a bias field;
(c) means for moving said medium relative to said energy source in said bias field with said one layer farther from the energy source than the other layer; and
(d) means responsive to bit data signals for switching said pulse of energy emitted from said energy source between a first pulse which heats the medium such that the temperature of said one layer remains below its Curie temperature while that of the other layer becomes near or above its Curie temperature, and a second pulse which heats the medium such that the temperatures of said two layers become near or above their Curie temperatures.

19. An apparatus according to claim 18, wherein said two layers are a TM-rich layer and a RE-rich layer without a compensation temperature.

20. An apparatus according to claim 18, wherein said two layers are a RE-rich layer with a compensation temperature and a RE-rich layer without a compensation temperature.

21. An apparatus according to claim 18, wherein said energy source is a laser source.

22. An apparatus according to claim 18, wherein said first pulse has such a short duration as to induce marked temperature gradients in said two layers, and said second pulse has such a long duration as not to induce marked temperature gradients in said two layers.

* * * * *